United States Patent Office 3,510,315
Patented May 5, 1970

3,510,315
EGG PRODUCT
Robert L. Hawley, Webster Groves, Mo., assignor to The Ralston Purina Company, St. Louis, Mo., a corporation of Missouri
No Drawing. Continuation-in-part of application Ser. No. 661,793, Aug. 21, 1967. This application Feb. 10, 1969, Ser. No. 798,144
Int. Cl. A23l 1/32; A23b 5/04, 5/02
U.S. Cl. 99—113                                    21 Claims

ABSTRACT OF THE DISCLOSURE

A prepared egg product and a method for making same wherein a solid, cooked egg yolk is surrounded by a solid, cooked egg white, the yolk containing therein a proteolytic enzyme and the egg white containing a water-binding material. The egg product may be frozen and thereafter thawed for consumer use without the previously known disadvantages, particularly, the separation of the moisture in the egg white from the albumen.

---

This application is a continuation-in-part of our co-pending application Ser. No. 661,793, filed Aug. 21, 1967, now abandoned.

This invention relates to an egg product and, more particularly it relates to a cooked egg product which can be frozen and thereafter thawed for subsequent use.

Various types of egg products are known in the art. Eggs have been cooked and placed in sealed containers for consumer use. Raw egg products have been prepared and frozen in order that they may be subsequently thawed and used in much the same manner as are fresh eggs. Certain egg products are produced by cooking the egg yolk portion and freezing them for future use. Although the yolk portion of eggs has been frozen in the raw and cooked forms, the egg white has only been successfully frozen in its raw form since once cooked, frozen and thereafter thawed, the moisture separates from the albumen in the egg white and results in a product which is unsuitable for subsequent use. It would, therefore, be desirable to provide a means for prodcing a cooked egg product which can be frozen and subsequently thawed, said product not exhibiting the disadvantageous properties heretofore known in the art.

In accordance with the present invention, a novel cooked egg product is provided in a process which comprises separating egg whites from egg yolks of raw eggs, placing into the egg yolk portion a proteolytic enzyme and mixing together, cooking the mixture in a mold at elevated temperatures to obtain a solid egg yolk, removing the solid egg yolk from the mold and placing said solid yolk into a mold of larger diameter, surrounding said solid yolk in the mold with the raw egg white portion and cooking at elevated temperatures, said egg white portion containing therein a water-binding carbohydrate, cooling the resulting product to room temperature, subjecting said product to temperatures less than 30° F. to obtain a completely frozen product, and subsequently raising the temperature to completely thaw the product.

The water-binding materials which may be employed in the invention include carbohydrates, such as cereals, starches or flour products which are capable of absorbing and binding water by virtue of its polymeric structure. Examples of such water-binding carbohydrates include corn, tapioca, rice and potato starches, flours and the like. Marine colloids such as algins, carrageenans, agar and the like may also be employed as water-binding materials. It is essential that the water-binding materials be of the type that will retain the water in the egg white portion after the product has been frozen and subsequently thawed. Carbohydrates which are particularly suitable for the practice of the present invention are starches which exhibit good freeze-thaw properties. The water-binding materials should be present in the egg white portion in an amount from about 0.5% to about 10.0% and preferably from about 2% to about 4% by weight based on the weight of the egg white.

The water-binding materials, particularly starch, must be of a type that will "flow," i.e., the starch particles must rupture or de-polymerize, at relatively low cooking temperatures in order to obtain desirable water absorbing properties. It is preferred that the water-binding materials "flow" at tempeatures from about 140° F. to about 180° F.

It is within the scope of the present invention to produce cooked egg white products which contain the hereinbefore mentioned water-binding materials. The consumer may desire to use such egg white products in food products where the presence of egg yolks would be unnecessary or undesirable. These products could also be frozen and subsequently thawed without the moisture separating from the albumuen in the egg white. Furthermore, where such egg white prodcts are stored under refrigeration conditions and become accidentally frozen, the particular product can be subsequently thawed without the above-described problem of moisture separation.

The proteolytic enzymes that can be employed in the present invention are of the type that will hydrolyze some or all of the protein in the yolk portion to which it has been added. Examples of such enzymes include papain, bromelin, pepsin, trypsin, and the like. The enzyme should be present in the yolk portion in an amount from about 0.0001% to about 0.1% ad preferably from about 0.001% to about 0.01% by weight based on the weight of the egg yolk portion. The proteolytic enzyme employed has a strength of about 6000 hehoglobin units per gram of the enzyme material. The enzyme can be added to the yolk at any time, i.e., before, during, or after comminution of said yolk and preferably after comminution. After adding the enzyme to the yolk, the mixture should be cooked as soon as possible since the enzyme works rapidly to hydrolyze the protein at elevated temperatures. The cooking temperature should be sufficiently high so as to inactivate the enzyme once the egg yolk has solidified. It is preferred that the enzyme be suspended in an aqueous solution before being added to the yolks. The cooking temperature of the yolk should be at least 180° F. to obtain a satisfactory yolk consistency and also to completely inactivate the enzyme.

The particular method of making an egg product of the invention provides a means for producing a cooked egg product which can be made into a variety of shapes and forms. More importantly, the particular composition of the product permits the freezing and thawing of said product without the previous known disadvantages of having the moisture separate from the egg white. An additional advantage is provided where the egg products are shipped or stored under refrigeration conditions and in the unfrozen state. The particular composition of said egg product would prevent loss of such products due to accidental or inadvertent freezing.

The following examples are illustrative of the invention and are not intended to limit the scope thereof.

EXAMPLE 1

(A) The whites and yolks from twelve fresh, cool eggs were separated and placed into individual containers. The yolk portion weighing 218 grams was placed in a high speed blender together with 1.0 ml. of a 1% solution of papain and thoroughly mixed for two minutes. The mixing was discontinued and the mixture left to stand in the blender for about ten minutes. The mixture was placed into a standard sausage casing 30 mm. in diameter and closed at both ends. The casing was placed into hot water at a temperature of about 200° F. for about twenty minutes. The casing containing the cooked yolk and enzyme mixture was removed and placed in cold water until the temperature of the yolk was about 100° F. The casing containing the yolk was removed from the cold water and the casing was removed from around the yolk. The yolk was placed into a second casing about 45 mm. in diameter.

The egg whites, weighing 427 grams, were placed into a high speed blender and 17.08 grams of modified tapioca starch were added to the egg whites. The whites and starch were mixed for about two minutes and immediately poured into the 45 mm. diameter casing containing the solid egg yolk. The casing was sealed and placed in hot water at a temperature of about 200° F. for about twenty minutes. The resulting product was removed and placed into cold water until the temperature of the product was about 100° F., then removed from the water and frozen in a blast freezer.

The cooked egg product was placed in the blast freezer at a temperature of about −30 F. for sixty minutes at the end of which time the product was completely frozen. The product was removed from the freezer and thawed to room temperature. The yolk was smooth and soft and easily sliced without crumbling. The white was smooth and firm. No syneresis (water exudation) was observed even when the white was pressed. The white was easily sliced and possessed a mouth feel similar to that of a freshly cooked, hard boiled egg.

A cross sectional slice of the resulting egg product had the appearance of a hard boiled egg and was superior to it in that the yolk did not crumble when sliced with a knife, nor did the white "tear" as the result of slicing. In addition the yolk was more solidly bound to the white and did not separate from it as with a natural hard boiled egg.

(B) In a comparative test, an egg product was produced substantially in accordance with the procedure described above except that the egg yolk contained no proteolytic enzyme such as papain and the egg white contained no water-binding material such as starch. Upon thawing the frozen product, the yolk was very firm and rubbery, difficult to chew and glossy in appearance. The cut surface of the white was rough in appearance and contained numerous small holes as a consequence of ice crystal formation and growth as the result of freezing. Syneresis was observed at the cut surface and large quantities of water separated from the white when pressure was applied thereto. The white was rubbery when chewed.

EXAMPLE 2

The procedure of Example 1 was substantially repeated except that 2 ml. of 0.1% of solution of papain was added to the egg yolk and was immediately cooked for thirty minutes.

The resulting product was very similar to the product produced and described in accordance with part A of Example 1.

EXAMPLE 4

The procedure of Example 1 was substantially repeated except that twenty-five grams of starch were added to the egg white. The white was very similar to that produced in part A of Example 1.

EXAMPLE 4

Liquid egg whites weighing 427 grams are placed into a high speed blender together with 17.08 grams of modified tapioca starch. The whites and starch are mixed for about two minutes and poured into a sausage casing having a diameter of about 30 mm. The casing is sealed and placed into hot water at a temperature of about 200° F. for about twenty minutes. The resulting product is removed and placed into cold water until the temperature is about 100° F., then removed from the water and frozen in a blast freezer at a temperature of about −30° F. for sixty minutes. The frozen product is removed from the freezer and thawed to room temperature. The egg white product is smooth and firm with no separation of the water from the product even when squeezed or pressed. The product is easily sliced and has a mouth feel similar to that of the white portion of a freshly cooked hard boiled egg.

In place of the particular enzymes and water-binding materials employed in the examples, other enzymes and water-binding materials may be employed in the invention as hereinbefore described to obtain substantially the same results.

What is claimed is:

1. A method for producing a cooked egg product which comprises separating egg yolks from egg whites of raw eggs, mixing the egg yolks together with a proteolytic enzyme; cooking the mixture in a mold at elevated temperatures to obtain a solid egg yolk; removing the solid egg yolk from the mold and placing said solid egg yolk into mold of larger diameter; surrounding said solid yolk with the raw egg whites and cooking at elevated temperatures, said egg whites having mixed therein a water-binding material; cooling the resulting product to room temperature; subjecting said product to temperatures less than 30° F. to obtain a completely frozen product and subsequently elevating the temperature of the product to a temperature sufficient to completely thaw said product.

2. The method according to claim 1 wherein the proteolytic enzyme is papain.

3. The method according to claim 1 wherein the proteolytic enzyme is present in the egg yolk in an amount from about 0.0001% to about 0.1% by weight based on the total weight of the egg yolk.

4. The method according to claim 1 wherein the water-binding material is a carbohydrate.

5. The method according to claim 4 wherein the water-binding carbohydrate is starch.

6. The method according to claim 1 wherein the water-binding material is present in the egg white in an amount from about 0.5% to about 10% by weight based on the total weight of the egg white.

7. The method according to claim 1 wherein the egg product is prepared in tubular molds.

8. A method for producing a cooked egg white product which comprises mixing liquid egg whites together with a water-binding material, heating the mixture to obtain a solid egg white, cooling the resulting product to room temperature, and subjecting said product to temperatures less than 30° F. to obtain a completely frozen product.

9. The method according to claim 8 wherein the water-binding material is a carbohydrate.

10. The method according to claim 9 wherein the carbohydrate is starch.

11. A prepared cooked egg product which can be frozen and subsequently thawed comprising an egg white surrounding an egg yolk, said egg yolk containing a proteolytic enzyme and the egg white containing a water-binding material.

12. The product according to claim 11 wherein the proteolytic enzyme is papain.

13. The product according to claim 11 wherein the proteolytic enzyme is present in the egg yolk in an amount from about 0.0001% to about 0.1% by weight based on the total weight of the egg yolk.

14. The product according to claim 11 wherein the water-binding material is a carbohydrate.

15. The product according to claim 14 wherein the water-binding carbohydrate is starch.

16. The product according to claim 11 wherein the water-binding material is present in the egg white in an amount from about 0.5% to about 10% by weight based on the total weight of the egg white.

17. A prepared cooked egg product which can be frozen and subsequently thawed comprising an egg white surrounding an egg yolk, said egg yolk containing papain and the egg white containing starch.

18. A prepared cooked egg product which can be frozen and subsequently thawed substantially without syneresis comprising a cooked fresh egg white containing a water-binding material.

19. The product according to claim 18 wherein the water-binding material is a carbohydrate.

20. The product according to claim 19 wherein the carbohydrate is starch.

21. The product according to claim 18 wherein the water-binding material is present in the egg white in an amount from about 0.5% to about 10% by weight based on the total weight of the egg white.

References Cited

UNITED STATES PATENTS

| | | | |
|---|---|---|---|
| 1,870,269 | 8/1932 | Tressler | 99—11 |
| 2,421,199 | 5/1947 | Gutmann | 99—16 |
| 3,285,749 | 11/1966 | Shires | 99—11 |
| 3,385,712 | 5/1968 | Dodge et al. | 99—11 |
| 3,222,194 | 12/1965 | Gorman et al. | 99—21 |

A. LOUIS MONACELL, Primary Examiner

W. BOVEE, Assistant Examiner

U.S. Cl. X.R.

99—161, 196